Aug. 30, 1966     T. C. WOOD     3,269,622

FISH STRINGER

Filed April 8, 1965

THOMAS C. WOOD
INVENTOR.

BY

*Ely Silverman*

ATTORNEY

United States Patent Office 3,269,622
Patented August 30, 1966

3,269,622
FISH STRINGER
Thomas C. Wood, 301 McCarthy, Borger, Tex.
Filed Apr. 8, 1965, Ser. No. 446,575
6 Claims. (Cl. 224—7)

This invention relates to a fish stringer and, more particularly, to an assembly of cooperating devices, each of which is adapted to secure a fish to a stringer line.

When a fisherman's boat moves through the water with captive fish on a stringer according to this invention, they will stay alive and fresh a longer time. This invention provides a fish stringer which permits attaching a fish subsequently caught without removing from the water the stringer or the fish already secured thereto. While fish stringer snap hooks and their line attachments in common use often become entangled with each other and with the string during normal use thereof and especially when there are two or more captive fish on the stringer, this invention avoids such twisting and tangling and is, further, of sufficiently sturdy construction that continued use thereof does not result in the disengagement of any of the snap hooks from the line.

According to this invention the hook in any one fish captive on the stringer of this invention is pivotally and rotatably joined to a flexible line, which line is similarly attached to a second hook, which second hook similarly movably holds another fish for similar motion about that line. Accordingly, the movement of one or more captive fish on a line does not provide any sudden shock or wounding action on any other captive fish on that line.

One object of my invention is to provide an improved fish stringer the fish snap hooks of which do not become entangled with either the stringer line or with other snap hooks secured to the same line while allowing the captive fish attached to said hooks a maximum amount of freedom and movement.

Another object of this invention is to provide a fish snap hook support subassembly that is strong, efficiently distributes along the line stresses transverse thereto, minimizes twisting stresses between adjacent like subassemblies, avoids twisting and longitudinal stresses between such subassemblies and such line, is stable, economical to manufacture, and does not loosen from the line on repeated use.

Other objects and advantages of this invention will be obvious to those skilled in the art from study of the below description and specifications and the hereto attached drawings, which drawings form a part of the description and specifications and wherein the same reference numbers refer to the same parts throughout, and references consisting of numerals and letters differing only in letters (e.g. 40A and 40B) refer to items that are identical in structure but found in different subassemblies;

Figure 1:
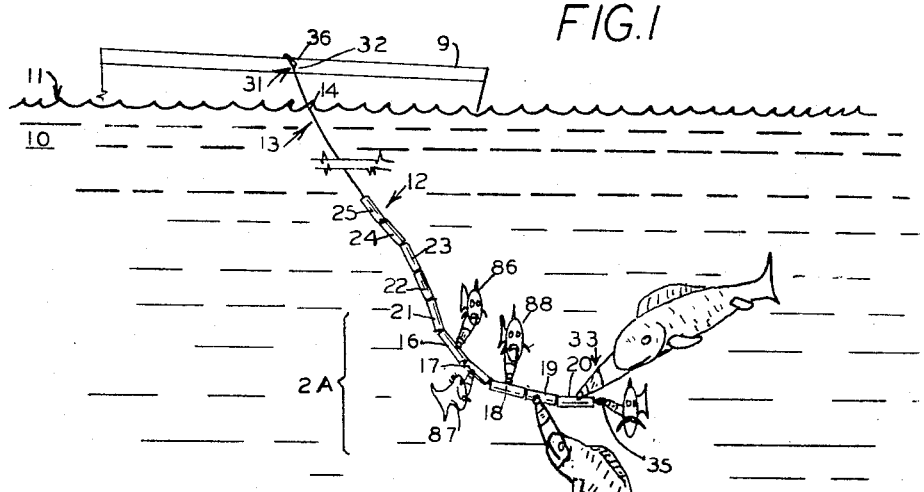
FIGURE 1 shows a moving boat from which trails a fish stringer according to the invention and on which are shown several captured fish.

Referring now to the drawings, the numeral 9 denotes a boat floating on water 10, to which boat a preferred embodiment 12, of the fish stringer of this invention is attached. The embodiment 12 comprises a woven nylon line 13 (which is ⅛ of an inch in diameter in the preferred embodiment) on which are serially strung each of a series of like snap hook and snap hook support subassemblies 16 through 25.

An upper portion 13 of the line 14 extends to about 3 feet below the upper level 11 of water 10 in which the boat 9 floats. The lower portion 15, of line 14, supports subassemblies 16 through 25 below level 11. While the line 14 is of any desired length sufficient to support the needed number of the snap hook and snap hook support subassemblies thereon a few feet below the water level 11, line 14, in the preferred embodiment, is ⅛" diameter nylon rope, and six feet long from one, upper end thereof 31, to the other, lower end 33. A permanent loop 34, is formed at the lower end. A lower end snap hook 35, is attached by its eye and a swivel to loop 34 at end 33 of line 14. A hook 36 is similarly attached at end 31.

In the preferred embodiment 12 herein described each of the subassemblies 16–25 is a duplicate of the other; accordingly, the description of subassembly 16 is applicable to the other similar subassemblies as below described. Subassembly 16 comprises a guide sleeve subassembly member 40 and a hook subassembly member 42 permanently yet pivotally connected to each other. The hook subassembly 42 is formed of a single length of wire having one end thereof bent to form an eye 44 and extended upwardly therefrom as strand 47 and then laterally, at 43, and downwardly to form a bill 45. The strands of wire on opposite sides of the eye 44 are secured in position by means of a substantially S-shaped plate 46, one end of which is coiled around the first metal strand indicated at 47 while the other end thereof is bent to form a keeper 48 for the reception of the bill 45. The hook subassembly 42B on subassembly 19 is shown in its open position: elements 42B, 43B, 47B, 45B, 48B, are identical to elements 42, 43, 47, 45 and 48 respectively; snap hooks 36 and 35 and subassembly 42 are identical.

Figure 2:
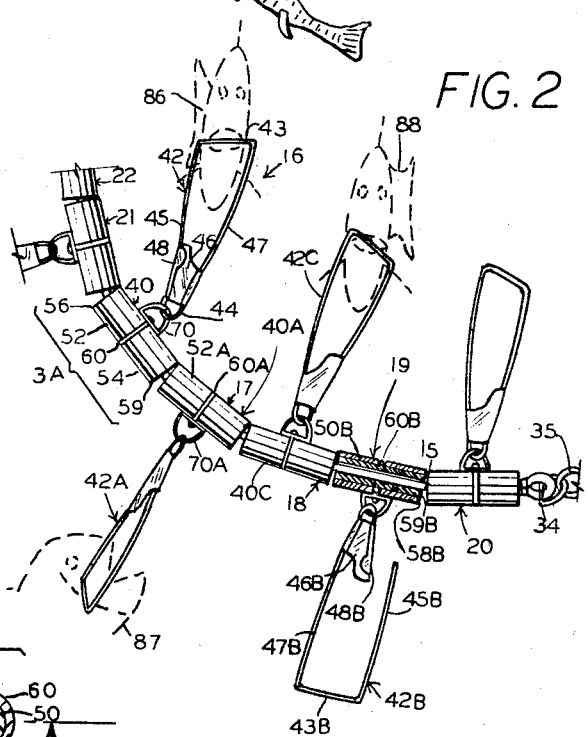
FIGURE 2 is an enlarged side view of zone 2A of FIGURE 1, partially in section, showing several snap hook and snap hook support subassemblies according to this invention in their usual working relations, without all the fish attached thereto shown in FIGURE 1; the portion shown in longitudinal section is a longitudinal section along a plane corresponding to plane 2A–2B of FIGURE 4.
Figure 3:
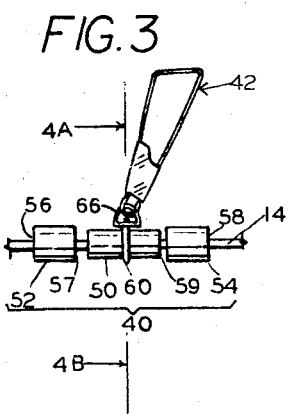
FIGURE 3 shows a blow-up, partially disassembled, view of the elements, of the subassembly 16 shown in zone 3A of FIGURE 2.

Each guide sleeve subassembly member 40 comprises a central complete cylindrical sleeve 50 and, concentric therewith and firmly affixed thereto, an upper (closer to end 31) collar 52 and a lower (closer to end 33) collar 54. The collars 52 and 54 are complete hollow cylinders and completely encircle sleeve 50 and, in the operative position of the apparatus as shown in FIGURE 2, have one edge thereof adjacent to ring 60 and firmly bound and fix the location of hook swivel support ring 60 on sleeve 50. The upper edge 56 of the upper edge of the upper collar 52 is smooth and flat and flush with, i.e. coplanar with, the smooth flat upper edge 57 of the inner sleeve 50. The lower edge 58 of the lower collar 54 is smooth and flat and flush with the smooth flat lower edge 59 of the central sleeve 50. Accordingly, the upper and the lower edges of each of the guide sleeves form a smooth flat circular surface considerably larger than the internal diameter of the guide sleeve. Sleeve 50 has a smooth complete cylindrical inner surface. The outer edges of collars 52 and 54 are smooth.

Each guide sleeve 40 is provided with a hook swivel support ring 60. The swivel support ring 60 completely surrounds and firmly grasps the outer surface of sleeve 50 and is provided with a radially projecting cylindrical shaft 63. Shaft 63 has an expanded head 65 at the outer end thereof.

Figure 4:
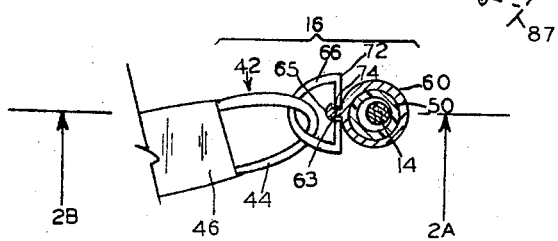
FIGURE 4 is transverse cross-sectional view along plane 4A–4B of FIGURE 3, enlarged to show details thereof.

Each ring as 60 is connected by the shaft 63 to a D-shaped ring 70: ring 70 comprises a plate 72 with a circular aperture 74 therein and a semi-circular, curved, strong slide member 66. The aperture 74 smoothly yet freely fits about the shaft 63 but cannot move past head 65 on the shaft 63. The semi-circular slide member 66 is attached to the plate 72 at both ends thereof and is firmly fixed thereto. The eye 44 of the hook subassembly 42 is slidably located around and engages the slide member 66 as shown in FIGURE 4.

Each guide sleeve, as 50 and 50B, completely encircles the cord 14. Each guide sleeve, as 50 and 50B, has an internal diameter that, as shown in FIGURES 2 and 4, is sufficiently larger than the outer diameter of line 14 therein to allow the sleeve to freely move along the line, but substantially less than twice the diameter—and being, preferably, about one and one half times the outer diameter—of said line, whereby to prevent two portions of said line from entering the same length of guide sleeve. This prevents tangling or knotting of the line 14 within sleeve 50. The ring 60 is firmly affixed to the sleeve 40; the swivel 70 is firmly affixed to ring 60 for rotation about shaft 63; the eye 44 is freely rotatable about the slide member 66 while firmly engaged by member 66.

In operation, the line 14 is attached by hook 36 to a nail or other fastening device firmly secured to the gunnel of the boat 9 or other suitable support and the string 14 and its subassemblies 16–25 are lowered into the water 10. When a fish is caught, the bill as 45 (or 45B) of the lowermost of the snap hooks as 42 not attached to a fish is placed through the mouth or other portion of the fish and the bill is moved into engagement with the corresponding keeper so as to retain the fish as 86 in position on the hook subassembly as 42. The guide sleeve 40 is then permitted to slide downwardly of line 14 with the hook in the fish. The sleeve moves downwardly to the position as shown for 16 in FIGURES 1 and 2 of the drawings until it contacts the top of the guide sleeve, as 40A, therebelow. Accordingly, as they are caught fish may be successively positioned on the string 14 without necessity of untieing the stringer line 14 or lifting the fish theretofore on that string into the boat each time it is desired to place an additional fish on the stringer. After the day's catch is completed the stringer with the fish thereon is elevated within the boat, the fish are then removed from their individual snap hooks and cleaned and the snap hooks dropped down line 14 for further use. Captive fish such as 86, 87, 88 attached to hooks as 42, 42A, 42B may freely rotate about, or in a plane parallel to, the line 14. The rotatable fixing of each hook subassembly as 42 to elements as 40 that space one hook subassembly such as 42 from another hook subassembly as 42A on an adjacent subassembly 17 (FIGURE 2) allows each of the captive fish as 86 and 87 to move about the stringer line 14 without interfering with each other. Further, the connections of the snap hooks as 42 and 42A to the rings as 70 and 70A, respectively, permits free rotation of each hook subassembly as 42 and 42A about such swivel ring about one axis while the rotatable fit of each swivel as 70 on its shaft as 63 permits the rotation of the swivel ring as 70 with respect to element 63 about an axis normal to that first axis without twisting of any connection.

Each plate as 72 is freely rotatable about its swivel shaft as 63; accordingly, there is no twisting of the line 14 in the sleeve 40 by circular motion of the fish 86 in a plane parallel to line 14. The sleeve 40 is freely rotatable about the line 14 and also may move up and down thereon: this permits several captive fish on hooks of apparatus 12 to move in opposing directions circularly about line 14 without applying twisting stress on the line 14.

The top edge of each sleeve as 50A of subassembly 17 and 50 of subassembly 16 and the top edge of the corresponding upper collar as 52 (and 52A) form a flat plane and form a smooth (non-catching) contact with the corresponding lower surface of the adjacent guide sleeve of the subassembly immediately thereabove. This avoids any catching of one guide subassembly on the other even when the longitudinal axis of one unit as 40A is at an angle to another, as 40 or 40C, adjacent thereto. The elements as 40, 40A, 40B are made of water resistant plastic which is not cracked, crazed, or corroded by contact with the water. There is no motion of subassemblies 16–25 of metal relative to the plastic in contact therewith to wear the plastic. The sleeve 50 inner surface does not wear on the cord 14.

The collar elements 52 and 54 are readily assembled onto the sleeve 40 and are firmly affixed thereto as by conventional glues (cf. chapter 22 of Plastics Engineering Handbook, by Society of the Plastics Industry, Inc. 3rd edition, Reinhold Publishing Corp., 1960) and preferably are brightly and distinctly colored.

In the preferred embodiment these sleeves and collars are polyethelene with smooth surfaces and rounded edges therebetween.

In the preferred embodiment the inner diameter of the sleeve 40 is $3/16$ of an inch. The outer diemeter of the sleeve and the inner diameter of the collars 52 and 54 is $5/16$ of an inch. The outer diameter of the collar 52 is $7/16$ of an inch. The overall length of each subassembly as 16 is 2 inches. Collar 52 is $31/32$ inch in length and collar 54 is $31/32$ inch in length. Ring 16 is $1/16$ inch thick.

This arrangement provides that one sub-assembly 16 freely rotates about the line 14 with no intreference therewith by any adjacent subassembly with which in contact nor with the cord; tangling of the cord is avoided by the lack of fixed attachment of the guide sleeves as 40, 40A, 40B, 40C to the cord 14.

In the preferred embodiment 12 there are 10 subassemblies as 16 through 25, each similar to the other, on stringer line 14. Additionally, a snap hook subassembly similar to subassembly 42 is provided at each end (31 and 33) of the line 14 at loops 32 and 34 respectively. The swivel elements 70, 70A, 70B are chrome plated as is each ring as 60, 60A, 60B. The hook subassemblies (as 42) are formed of galvanized steel and may also be chrome plated. In the particular preferred embodiment the snap hook subassemblies as 42 are each three and a half inch in overall length and arm 43 (between the bill 45 and the arm 47) is one and a quarter inch long.

The close fit of collars 52 and 54 on each side of swivel support ring 60 prevents any substantial flexure of the longitudinal axis of sleeve 50 about the plane (perpendicular to that axis) in which plane the edges of ring 60 lie.

The smooth slidable yet firm contact of adjacent top and bottom edges of adjacent sleeve members as 40 and 40A transfers axial stresses (due to action of a captive fish attached to the hook attached to such sleeve) from one such sleeve to the other while minimizing such stresses within any one sleeve.

The complete enclosure of sleeve 50 by ring 60 minimizes stresses at any one point on the line 14 enclosed within the sleeve 50 and distributes the stress applied to ring 60 over the entire length of line within such sleeve as 50. This reduces friction as well as wear on line 14 due to application to sleeve 50 of forces transverse to the length of line 14.

Although, in accordance with the provision of the patent statutes, a particular preferred embodiment of this invention has been described and the principles of the invention have been described in the best mode in which it is now contemplated applying such principles, it will be understood that the operations, constructions and compositions shown and described are merely illustrative and that my invention is not limited thereto and, accordingly, alterations and modifications which readily suggest themselves to persons skilled in the art without departing from the true spirit of the disclosure hereinabove are intended to be included in the scope of the annexed claims.

In the preferred embodiment, the element 52 and corresponding elements as 52A, 52B, and 52C, are permanently and thoroughly colored a bright green as "Emerald"

green, item 6, color chart B of page 540, Webster's New International Dictionary, second edition, unabridged, published by G. & C. Merriam Company, 1961, and elements 54 and corresponding elements as 54A, 54B, 54C, are permanently and thoroughly colored a bright red as "Carmine" as shown as item 129 of color chart D of the above mentioned color chart.

These bright and contrasting colors on each of the subassemblies as 40, 40A, 40B, serve to keep the attention of each of the fish as 86 when captive on the stringer 12 of this invention, especially when such fish are placed with reasonable care on the bills such as 45, with the bill going through the gill and the mouth of the fish in order to provide minimum harm and pain thereto. In such situations the dimension of each of the hook elements as 42 is such that the fish attached thereto as 86 may see it and also see adjacent colored elements; apparently the fish are fascinated thereby and focus thereon and swim about without pulling away and quietly. Such swimming is done relatively passively when such object so brightly colored are nearby; the depth at which the stringer sleeves as 40, 40A, 40B is usually operated, i.e., between 3 and 6 feet from the surface of the water, allows sufficient light to come down to such subassemblies as 40 so that the captive fish may readily see such brightly colored object; the contrast helps. Preferably the items as 52 and 54 are of a single solid bright color which is readily visible at a depth of 6 feet in relatively clear water. The permanence of the colors on the collars as 52 and 54 is effected in embodiment 12 by such plastic collars being thoroughly the same color throughout. The structure of this embodiment allows the subassemblies as 40 to be readily and reliably and inexpensively assembled.

The smooth surfaced plastic of which the sleeves as 40, 40A, 40B are made, provides for a deadening of any possible noise between the several adjacent sleeves as 40 and 40A. Metal sleeves provide a jangling noise. This stringer as 12 is a quiet stringer. The usual metal stringer as in U.S. Patent 2,517,761, creates a jangling noise which is especially severe underwater, because of the scraping metallic contact of one metal element against the other. The conventional metallic noise results in that after a fish is on a conventional stringer, the noise created by the contact between the several metal elements scares other fish away. This is especially important in the case of fish sensitive to noise, such as bass. The smooth contact of one plastic sleeve against the other provided by this invention does not create such an undesirable underwater noise.

This structure of embodiment 12 also provides that the various elements as 16–25 to which fish are not attached are kept in the boat and provide no underwater sounds that might frighten fish by contact between adjacent moving empty assemblies such as 16–25.

According to this invention the subassemblies of sleeve and hook to which fish are not attached are kept in the boat 9. This provides that there is no contact between adjacent subassemblies as 16–25 underwater unless a fish is attached thereto (FIG. 1 does not show fish on subassemblies 21–25 only for purposes of simplicity in representation); the fish serve to keep the subassemblies 16–25 that are underwater spaced apart and quiet. As each fish is caught it is added to a hook of the lowermost empty assembly and that subassembly, as 21, with that hook and fish, is then moved down the string to position adjacent to the next sleeve to which the fish is attached. This results in that the entire string 12 is kept very quiet while underwater with fish thereon and that there is no metallic jingle developed underwater thereby because of the sound deadening resulting from the use of relatively soft and smooth surfaced plastic for the sleeves as 40 according to this invention. This absence of noise avoids frightening the fish in the nearby area that a fisherman in boat 9 using the stringer 12 may desire to catch and also tends to pacify and avoid frightening the captive fish already on stringer 12.

I claim:

1. A fish stringer comprising, in combination, a flexible string member and a plurality of sleeves each completely encircling and permanently secured to said string, each said sleeve having a smooth inner surface with a minimum inner diameter greater than the maximum outer diameter of said string, a pivot support member completely encircling and firmly affixed to said sleeve member approximately one-half way between the ends of said sleeve member, said pivot support member being provided with a member projecting radially from the surface of said sleeve member, a swivel member rotatably attached to said pivot support member, and a hook member rotatably attached to said swivel member at a point spaced apart from the point of attachment of said swivel member to said pivot support member.

2. Apparatus as in claim 1 wherein the upper surface of each of said sleeves is smooth and the lower surface thereof is smooth whereby these elements smoothly rotate one past the other adjacent thereto on said line.

3. Apparatus as in claim 2 wherein said sleeve element is formed of a first member cylindrical on its interior surface and has an internal diameter less than twice the outer diameter of said cord, all said sleeve members being of the same internal diameter and length as each other.

4. Apparatus as in claim 3 wherein each sleeve element is formed with an inner sleeve and an outer sleeve, said outer sleeve having the same internal diameter as the outer diameter of the first sleeve, the pivot support member being firmly affixed to the outside of a said inner member, and said inner and outer sleeve members being firmly affixed to each other.

5. Apparatus as in claim 4 wherein said hook member comprises a single length of wire having one end thereof bent to form an eye and the other end extended downward and then up to form a bill, a keeper attached at one side thereof to one of those arms and forming a keeper at its other end for said other arm.

6. Apparatus as in claim 2 wherein the outer upper and lower and side surfaces of each of said sleeves are formed of a soft and non-metallic material whereby adjacent sleeves rotate and slide past each other silently.

References Cited by the Examiner

UNITED STATES PATENTS

| | | | |
|---|---|---|---|
| 2,517,761 | 8/1950 | Boyer | 224—7 |
| 2,796,209 | 6/1957 | Holmes | 224—7 |
| 2,804,247 | 8/1957 | Gallagher | 224—7 |

GERALD M. FORLENZA, *Primary Examiner.*

J. E. OLDS, *Assistant Examiner.*